US009519746B1

(12) United States Patent
Madiraju et al.

(10) Patent No.: US 9,519,746 B1
(45) Date of Patent: Dec. 13, 2016

(54) ADDRESSING EARLY MODE SLACK FAILS BY BOOK DECOMPOSITION

(71) Applicant: International Business Machines Corporation, Armonk, NY (US)

(72) Inventors: Mithula Madiraju, Bangalore (IN); Rahul M Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/736,357

(22) Filed: Jun. 11, 2015

(51) Int. Cl.
*G06F 9/455* (2006.01)
*G06F 17/50* (2006.01)

(52) U.S. Cl.
CPC .................. *G06F 17/5081* (2013.01)

(58) Field of Classification Search
CPC .................................................. G06F 17/5036
USPC ................. 716/104, 106, 107, 108, 111, 113
See application file for complete search history.

(56) References Cited

U.S. PATENT DOCUMENTS

| 5,259,006 A | 11/1993 | Price et al. |
| 5,475,605 A | 12/1995 | Lin |
| 6,711,729 B1 | 3/2004 | McElvain et al. |
| 7,996,812 B2 | 8/2011 | Kotecha et al. |
| 2001/0007144 A1 | 7/2001 | Terazawa |
| 2004/0230924 A1* | 11/2004 | Williams ............... G06F 17/505 716/103 |
| 2005/0268263 A1 | 12/2005 | Sun et al. |
| 2010/0042955 A1* | 2/2010 | Kotecha .............. G06F 17/5031 716/132 |

\* cited by examiner

*Primary Examiner* — Brian Ngo
(74) *Attorney, Agent, or Firm* — Mark G. Edwards (57) ABSTRACT

A computer implemented method for correcting early mode slack fails in an electronic circuit can include generating a logical description of an electronic circuit having a path from first circuit to a second circuit. The method then include compiling the logical description into a technology specific representation of the circuit. The method may further include determining that the path has an early mode slack fail. The method may be continued by identifying, in response to determining that a second path has a first early mode slack fail, a complex logic gate located in the second path and having an output coupled to the input of the second circuit that can be decomposed into two or more logic gates. The method may then conclude by decomposing, by processor, the complex logic gate into a two or more logic gates to address the early mode slack fail.

20 Claims, 7 Drawing Sheets

ADDRESSING EARLY MODE SLACK FAILS BY BOOK DECOMPOSITION

BACKGROUND

The present disclosure relates to electronic circuits, and more specifically, to addressing early mode slack fails in electronic circuits by complex book decomposition.

Computer aided design (CAD) software systems can be used in the development (e.g., design, emulation, and simulation) of electrical circuits and electronic systems. These CAD software systems can improve the efficiency of the design and evaluation of electrical systems by allowing engineers to assemble complex circuits by borrowing from established libraries of electrical components.

A given electrical circuit or electronic system may include a number of electrical paths conveying signals between configurations of sequential and combinational logic sub-circuits. One or more of these electrical path may converge at a single endpoint, with the signals conveyed in each path providing inputs to the same sub-circuits at the endpoints. Electric systems can be designed with consideration towards orchestrating the timing and interaction of signals conducted along disparate paths in a circuit and terminating at these endpoints.

SUMMARY

According to embodiments of the present disclosure, a computer implemented method for correcting early mode slack fails in an electronic circuit can include generating a logical description of an electronic circuit having a path from first circuit to a second circuit. The method then include compiling, by a processor, the logical description into a technology specific representation of the electronic circuit. The method may further include determining, by a processor, that a second path in the technology specific representation of the electronic circuit corresponding with the first path has a first early mode slack fail at the second circuit, wherein an early mode slack fail results when an output of the first circuit coupled to an input of the second circuit has an early mode slack below a first threshold value. The method may be continued by identifying, in response to determining that the path has a first early mode slack fail, a complex logic gate located in the second path and having an output coupled to the input of the second circuit, that can be decomposed into two or more logic gates to correct the first early mode slack fail. The method may then conclude by decomposing, by processor, the complex logic gate into a two or more logic gates to address the early mode slack fail.

Embodiments are directed toward a computer system for addressing early mode slack fails in an electronic circuit. The computer system may include one or more computing nodes having a memory and a processor, and a computer readable storage medium of the one or more computing nodes having program instructions embodied therewith, the program instructions executable by the processor to cause the computer system to: generate a logical description of an electronic circuit having a first path from first circuit to a second circuit; compile the logical description into a technology specific representation of the electronic circuit; determine that a second path in the technology specific representation of the electronic circuit corresponding with the first path has a first early mode slack fail at the second circuit, wherein an early mode slack fail results when an output of the first circuit coupled to an input of the second circuit has an early mode slack below a first threshold value; identify, in response to determining, a complex logic gate located in the second path and having an output coupled to the input of the second circuit, that can be decomposed into two or more logic gates; and decompose, by a processor, the complex logic gate into a two or more logic gates to address the early mode slack fail.

Various embodiments are directed toward a computer program product for addressing early mode slack fails in an electronic circuit.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic circuits, more particular aspects relate to addressing early mode slack fails in electronic circuits by complex book decomposition. While the present disclosure is not necessarily limited to such applications, various aspects of the disclosure may be appreciated through a discussion of various examples using this context.

Embodiments of this disclosure are based on the recognition that the timing of signals arriving at a single endpoint in an electronic system after being conducted along disparate electrical paths can influence the design and a performance of electronic systems. An endpoint may be the outputs of an electronic circuit, or the inputs of a flip-flop. Timing requirements, including those for early and late mode slack, may enable engineers to include these timing considerations in the design of electrical systems. Violation of the timing requirements during the design of electrical systems may result in a failure in one or more aspects of electrical systems.

Various embodiments of the present disclosure are directed towards a method for correcting early mode slack fails (e.g. fast path fails) in electronic systems. The method may include decomposing complex logic gates located in an electrical path having the early mode slack fail into configurations of a plurality constituent logic circuits. The inputs to the constituent logic circuits may be configured to slow down the fast paths by increasing the number of logic stages a signal conducted along the path propagates though before reaching an endpoint. Moreover, the method may address early mode slack fails by adjusting the physical or technology specific characteristics of the decomposed cells (e.g., gate threshold voltage, or device geometry) to further slow the fast paths.

Embodiments of the present disclosure are directed towards a system and a computer program product for implementing the method for addressing early mode slack fails in electronic systems.

As used here in, a component library may be a collection or database of electronic components, related data, and device models available to a computer aided design system (e.g., an electronic circuit design system). The component library may include cells or books representing individual electronic components or complex electronic functions (e.g., complex logic gates). According to some embodiments, a book that represents a complex logic gate (e.g., a logic gate that cannot be performed by a single two-input logic gate) may be decomposed into two or more books or logic gates. Decomposing complex logic gate may include reducing the complex logic gate into a configuration of two or more basic logic gates configured to perform the same function of the complex logic gate.

The design and development of electronic systems can include analyzing the timing behavior of signals propagated along disparate electrical paths. The timing analysis can include accessing a netlist representing and the electronic system, including technology specific timing models of the components of the electronic system, and determining whether the design of the electronic system satisfy given timing requirements. Determining whether a given timing requirement is satisfied may include calculating the arrival times of signals at various endpoints in a circuit, or determining the longest or shortest delays for signals propagating through paths in a circuit or network of sub-circuits (e.g., determining the slowest and fastest paths). The timing analysis of electronic systems having both sequential and combinational logic circuits may consider the early mode and late mode timing behavior of signals propagated in these circuits.

Early mode timing considers whether signals remain stable long enough at an endpoint to be represented in a sequential or combinational logic operation. Early mode timing requirements (e.g., a hold time requirement) can specify the earliest time that a signal is allowed to become unstable at an endpoint following an event associated with a logic operation (e.g., the occurrence of a clock edge). The early mode timing requirement may be stated as a requirement on early mode slack. In embodiments, early mode slack may be a unit of time by which a late arriving first signal (e.g., a late clock) at an endpoint must precede a second signal that goes unstable early at the same endpoint. Stated differently, early mode slack may be the resulting difference when the earliest time a signal is allowed to become unstable at an endpoint (e.g., as defined by a hold time requirement) is subtracted from the earliest time that the same signal may actually become unstable at an endpoint. Represented this way, a negative early mode slack may identify an early mode timing violation (e.g., because a signal becomes unstable before it is fully represented or captured in a logic operation). An early mode timing violation may also be determined by establishing a threshold early mode slack value, and specifying that a violation occurs when early mode slack falls below the threshold.

A path in an electronic circuit may have an early mode slack fail when one or more circuits in the path have early mode violations. In embodiments, addressing early mode slack fails may include correcting (e.g. removing) early mode violations in a path, or increasing early mode slack to a desired value.

Late mode timing considers whether signals arriving at an endpoint become stable in time to be represented in a logic operation. Late mode timing requirements (e.g., a setup time requirement) can specify the latest time a signal is allowed become stable at an endpoint before an event in a logic operation. The late mode timing requirement may be stated as a requirement on late mode slack. In embodiments, late mode slack may be a unit of time for which a first signal arriving late an endpoint (e.g., a late data) must be stable before a second early arriving signal (e.g., an early clock) reaches the endpoint. Stated differently, late mode slack may be the resulting difference when the latest a signal can become stable at an endpoint is subtracted from the latest a signal is allowed become stable at an endpoint. Represented this way, a negative late mode slack may identify a late mode timing violation (e.g., because the clock signal arrives too early at an endpoint). A late mode timing violation may be determined by establishing a threshold late mode slack value, and specifying that a violation occurs when late mode slack falls below the threshold.

Figure 1:
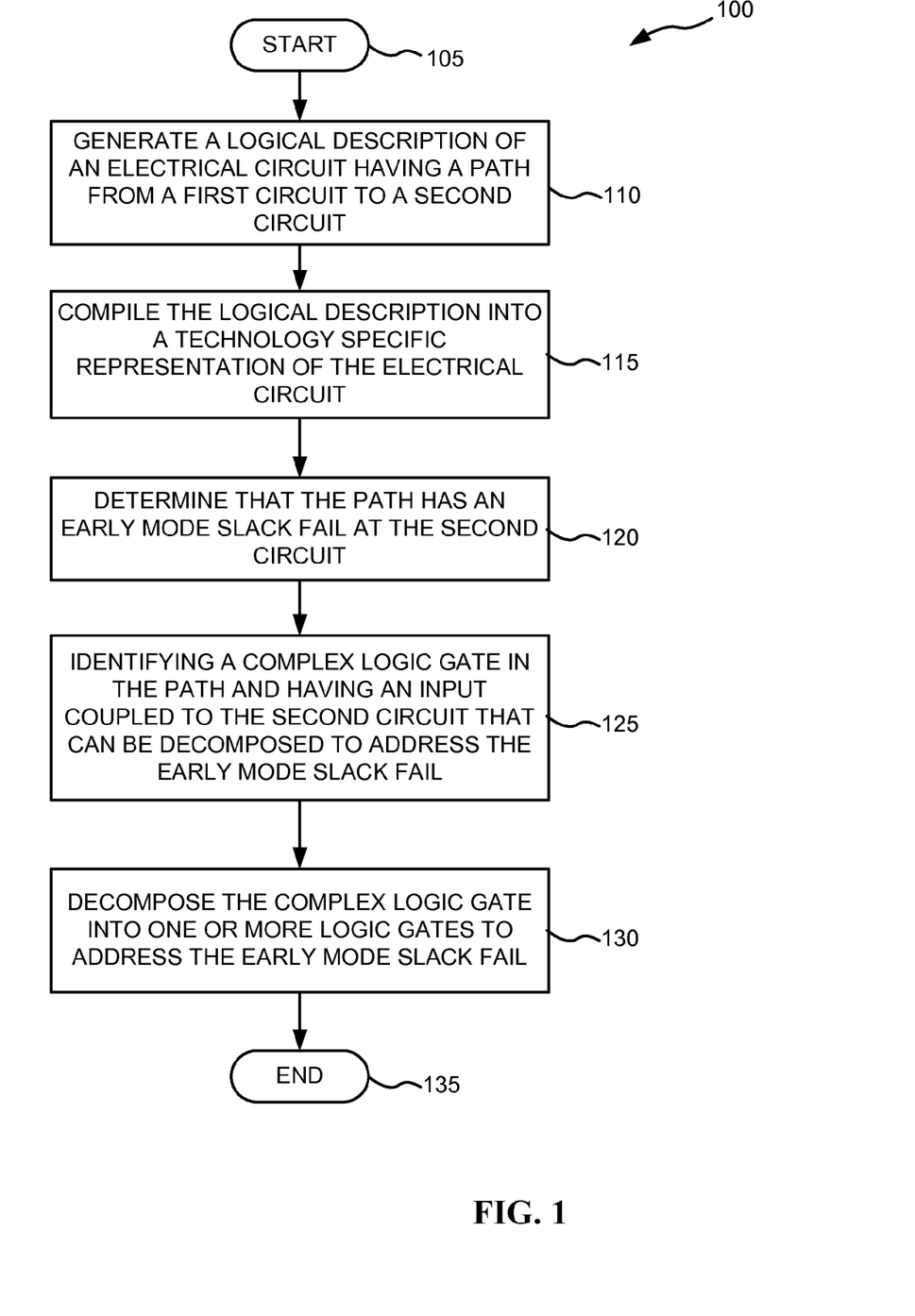
FIG. 1 depicts a flowchart of a method for correcting early mode slack fails in electronic circuits, according to various embodiments.

Referring now to the figures, FIG. 1 depicts a flowchart of a method 100 for correcting early mode slack fails in electronic circuits, according to various embodiments. The method 100 may be automatically carried out by a script controlling a circuit design computing system having one or more software applications, including associated modules and libraries, executing on a processor of computing device such as computing device 700 described in FIG. 7 infra. The method 100 may begin at operation 105 when the script loads the circuit design system into a memory of a computing device. Loading the circuit design system may include accessing and loading library components, and a series of circuit design and analysis modules (described infra) in at memory of a computing device. The remaining operations may carried out by the circuit design system on behalf of or in conjunction with the script.

The circuit design system may continue the method 100 by performing operation 110, generating a logical description of an electronic circuit having a path (e.g., an electrical path) from a first circuit to a second circuit. An electronic circuit may be an electronic system or digital circuit having combinational and/or sequential logic components (e.g., combination logic gates such as AND and OR gates, and sequential devices such as clocked flip-flops and synchronous latches). The combinational logic components may include basic and complex logic gates for various functions (e.g., AND, NAND, OR, and XOR gates). Each component of the electronic circuit may be a supplied from a component library consisting of basic cells and complex cells. A complex logic cell may be a logic cell having a logic function that cannot be performed by a single two-input logic cell.

The logical description of the electronic circuit may include a representation of the electronic circuit indicating the interconnection of disparate logic components having inputs and outputs, and describing the electrical paths for conducting signals between the logic components. The logical description may also include logical and mathematical expressions representing each component of the electronic circuit along with their associated interconnections. In some embodiments, a circuit design module of the circuit design system may automatically generate the logical description by reading an electronic file containing a description of the circuit and selecting cells or books from a component library to use in the generation of the logical description.

The circuit design system may continue the method 100 at operation 115 by compiling the logical description of the electronic circuit into a technology specific representation of the circuit. Electronic circuit manufacturing technologies may vary according to, inter alia, the physical processes (e.g., materials used to construct devices, and semiconductor doping levels) used in constructing components, the device geometries of components and interconnects, timing requirements, and the operating and threshold voltages of devices. The circuit design system may direct a compiling module to compile a technology specific representation of the electronic circuit by drawing from a library of technologic specific resources, including data containing timing information, and formulas representing, inter alia, propagation delays through components and interconnects. In some embodiments, a technological specific representation of an electronic circuit may be an electronic representation of an electronic circuit having information relating to the implementation of the electronic using a specific manufacturing technology. The resulting technology specific representation of the electronic circuit may include information, such as timing requirements and device models, to enable a timing analysis to be performed on the electronic circuit.

The circuit design system may continue the method 100 by performing operation 120, determining that a path in the electronic circuit has an early mode slack fail. According to various embodiments, an electrical path from a first sub-circuit (e.g., a first circuit) to a second sub-circuit (e.g., a second circuit) may have an early mode slack fail if at least one logic circuit in the path, situated between the first sub-circuit and the second sub-circuit and having an input coupled to the second circuit, has an early mode violation. In some embodiments, an early mode slack violation may result when an input to the at least one logic circuit has a negative early mode slack, or has an early mode slack that is below a threshold value. The circuit design system may direct a circuit analysis module to calculate the early mode slack at the inputs of each logic circuit in an electrical path having an early mode fail using the formula described previously herein. Additionally, the circuit design module may obtain technology specific requirements on early mode arrival times, including threshold values for early mode slack from a technology specific component library, or from the technology specific representation of the electronic circuit compiled in operation 115. In some embodiments, an early mode slack fail may result in two or more logic operations being performed incorrectly due to, inter alia, signals violating timing requirements at the inputs of logic components.

The circuit design system may continue the method 100 at operation 125 by identifying a complex logic gate, located between a first sub-circuit and a second sub-circuit in a path having an early mode fail and having an input coupled to the second sub-circuit, that can be decomposed to address the early mode slack fail. A complex logic gate may be a logic gate having a logic function that cannot be performed by a single two-input logic gate. The complex logic gate may be suitable for decomposition if a configuration of two or more constituent logic gates can represent or perform the logic function of the complex logic gate. In certain embodiments, a complex logic gate that is suitable for decomposition may have at least one input having early mode violations. In some embodiments, a complex logic gate is suitable for decomposition if at least two inputs have early mode violations. In particular embodiments, the number of inputs of a complex logic gate having early mode violations may be less than the total number of inputs of the complex logic gate. Additionally, when multiple complex logic gates satisfy the above criteria, the complex logic gate having the greatest difference between late mode and early mode arrival times at an endpoint may be selected for decomposition.

In some embodiments, identifying a complex logic gate for decomposition may include the added requirement that the identified gate have some positive late mode slack on each input.

In other embodiments, identifying a complex logic gate for decomposition may include identifying at least two complex logic gates in the path having an early mode slack fail and determining the difference between late and early mode arrival times for each of the at least two complex logic gates (e.g., identify a first complex logic gate having a first difference between early mode and late mode arrival times, and a second complex logic gate having second difference between late mode and early mode arrival times. In some embodiments, the difference between late and early mode arrival may be determined for a given input (e.g., the difference may be determined using the both the late and early mode arrival times of a single input of a complex logic gate). In other embodiments, the difference between late and early mode arrival times may be determined across inputs of a complex logic gate (e.g., the difference may be determined using the late mode arrival time of a first input and the early mode arrival time of a second input of the complex logic gate). The complex logic gate having the greatest difference between early and late mode arrival times may then be selected for decomposition.

The circuit design system may continue the method 100 by performing operation 130, decomposing the complex logic gate identified in operation 125 into two or more logic gates (e.g., constituent logic gates) to address the early mode slack fail. The circuit design system may decompose the complex logic gate by replacing the complex logic gate with two or more constituent logic gates configured to perform the same function of the complex logic gate. In some embodiments, the circuit design system may decompose the complex logic gate to provide an input having an early mode violation a longer path (e.g., a path through multiple logic states) though the two or more constituent logic gates, while providing an input with negative or less positive late mode slack a shorter path through the two or more logic gates. In certain embodiments, two or more logic functions (e.g., a NOT or invert function) may be inserted into at least the path of an input having an early mode violation to further mitigate the early mode slack fail.

According to certain embodiments, the circuit design system may extend the decomposition operation 125 by detuning the two or more constituent logic gates. Detuning the two or more constituent logic gates may include reducing the geometry or size of the gates (e.g. selecting gates from the component library having smaller dimensions). Detuning the two or more constituent logic gates may also include increasing the threshold voltages of the gates (e.g., performing a threshold voltage swap). In certain embodiments, detuning the two or more logic gates may increase early mode slack by, for example, increase the switching times of the gates, or by extending the propagations delays though the gates.

The circuit design system may end the method 100 at operation 135 when the early mode fails are addressed as described herein. However, when the early mode slack fails have not be not been adequately addressed, the circuit design system may continue the method 100 by either returning to operation 120 and identifying an new path having early mode slack fails, or by returning to operation 125 and identifying another complex logic gate that can be decomposed.

Figure 2:
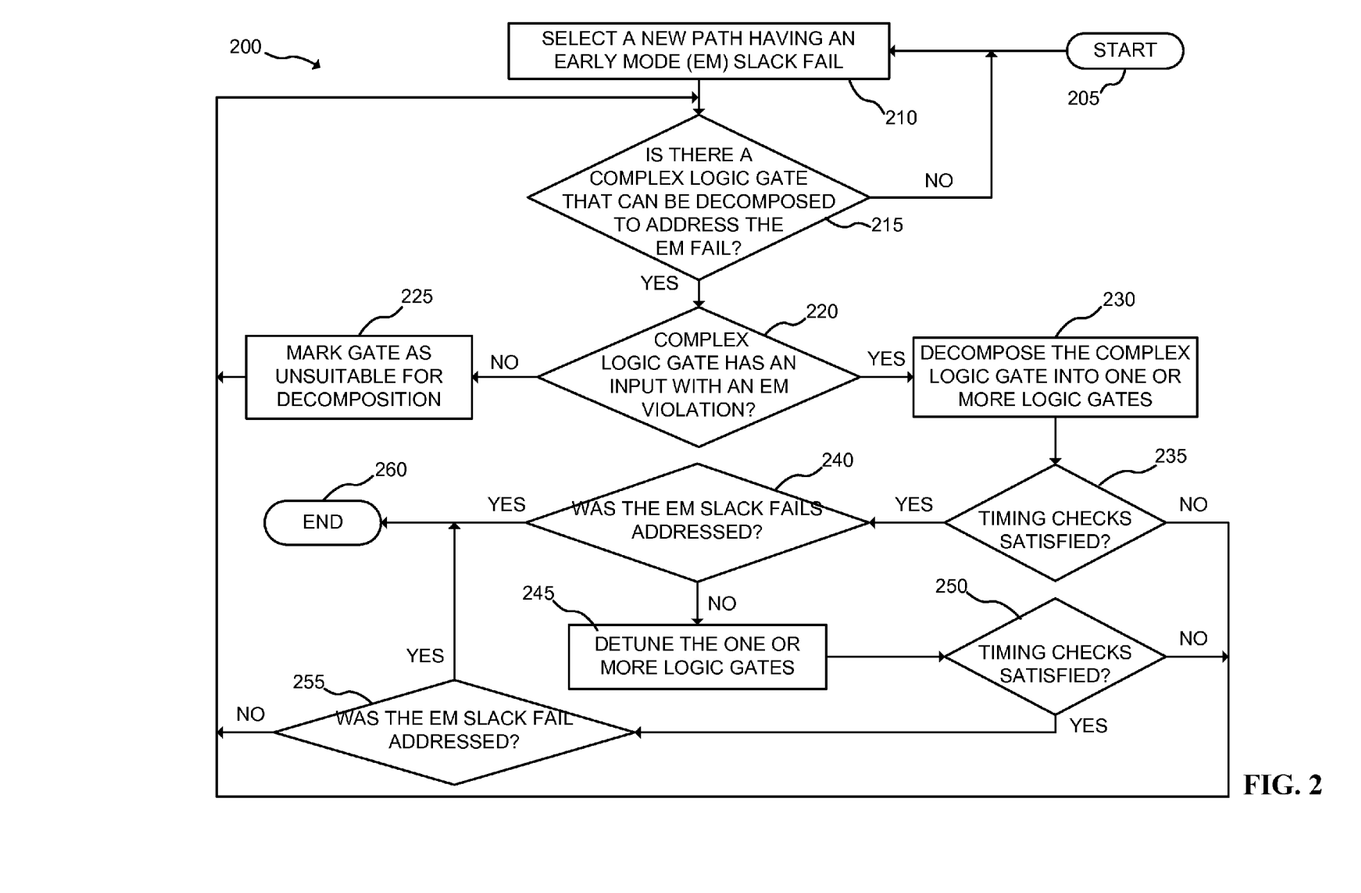
FIG. 2 depicts a second flow chart of a method for correcting early mode slack fails in electronic circuits, according to various embodiments.

FIG. 2 depicts a second flow chart of a method 200 for correcting early mode slack fails in electronic circuits, according to various embodiments. The method 200 may be automatically carried out by a script controlling a circuit design computing system having one or more software applications, including associated modules and libraries, executing on a processor of computing device such as computing device described in FIG. 7 infra. The method 200 may begin at operation 205 when the script loads the circuit design system into a memory of the computing device. Loading the circuit design system may include accessing and loading library components, and a series of circuit design and analysis modules (described infra) into a memory of the computing device. Loading the circuit design system may also include generating or accessing a logic description of an electronic circuit and compiling the logic description into a technology specific representation of the electronic circuit, as described in operations 110 and 115 of the method 100. Some aspects of method 200 may be an equivalent of embodiment of the method 100 beginning at operation 120 of the method 100. The operations of the method 200 may carried out by the circuit design system on behalf of or in conjunction with the script.

The circuit design system may continue the method 200 at operation 210 by selecting a new path having an early mode slack fail. During a first iteration of the method 200, selecting a new path having an early mode slack fail may include identifying one or more electrical paths in a technology specific representation of the electronic circuit having early mode slack fails—where a path with an early mode slack fail can be identified as discussed in operation 120 of the method 100—and selecting one of the identified paths. During a subsequent iteration of the method 200, the circuit design system may select a second one of the identified paths that was not analyzed during a previous iteration of the method 200.

The circuit design system may then proceed to operation 215 and determine whether there is a complex logic gate that can be decomposed to address the early mode slack fail associated with the selected path. A complex logic gate that may be decomposed to address the early mode slack fail may be identified as discussed in operation 125 of the method 100. The circuit design system may return to operation 210 and select a new path to analyze when a suitable complex logic gate cannot be identified. Alternatively, the circuit design system may continue to operation 220 when it identifies a suitable complex logic gate.

At operation 220, the circuit design system may determine whether the complex logic gate has at least one input with an early mode violation. The circuit design system may determine that an input has an early mode violation by, for example, determining that the early mode arrival time of a signal at an input of the selected complex logic gate is earlier (e.g. faster) than the allowed early mode arrival time for the signal at the input (e.g., early mode slack is negative or below a technology specific threshold value). The allowed early mode arrival time may be determined by technology specific characteristics of the electronic circuit as discussed herein.

In some embodiments, when the complex gate does not have at least one input with an early mode violation, the circuit design system may continue to operation 225 and mark the complex logic gate as unsuitable for decomposition. The circuit design system may then return to operation 215 and identify another complex logic gate for decomposition.

The circuit design system may continue the method 200 at operation 230 when it determines, at operation 220, that the identified complex logic gate has at least one input with an early mode violation. At operation 230, the circuit design system may decompose the complex logic gate into one or more constituent logic gates (e.g., basic logic gates). The complex logic gate may be decomposed according to the techniques as discussed in operation 130 of the method 100.

Subsequent to decomposing the complex logic gate, the circuit design system may continue the method 200 at operation 235 by determining whether timing checks are satisfied for the electronic circuit as modified. Determining that timing checks are satisfied may include determining that restrictions on late mode arrival times and late mode slack are not being violated. Additionally, determining that timing check checks are satisfied may include determining that technology specific electrical timing requirements, including requirements on slew rate and rise times, are not being violated. The circuit design system may discard (e.g., reject) the change to the electronic system (e.g., the substitution of constituent logic gates for the selected complex logic gate) and return to operation 215 when the circuit design system determines that the modified electronic circuit violates one or more timing checks. Alternatively, the circuit design system may continue to operation 240 when the modified electronic circuit does not violate the timing checks.

At operation 240, the circuit design system may determine whether the early mode slack fails of the selected path were addressed. In some embodiments, determining that the early mode slack fail has been addressed includes determining that the early mode slack at sub-circuit (e.g. a second circuit) at the end of the path has been increased above a threshold value. The threshold value may be a technology specific value determined from a library of technology specific timing values and requirements, as discussed herein.

In some embodiments, the method 200 may end at operation 260 when the circuit design system determines that the early mode fails of the selected path were addressed. In other embodiments, the method 200 may be continued at operation 205 or operation 210 while there are additional paths with early mode slack fails.

The circuit design system may continue the method 200 by performing operation 245 when it determines that the early mode violations for the selected path were not corrected at operation 240. Performing operation 245 can include detuning the two or more constituent logic gates as described in the discussion of operation 130 of the method 100.

Subsequent to detuning the two or more logic gates, the circuit design system may continue the method 200 at operation 250 by determining whether timing checks are satisfied for the electronic circuit as modified by the detuning. Determining the timing checks are satisfied may be performed as described in operation 235. The circuit design system may discard (e.g., reject) the detuning changes to the electronic circuit, including, for example, the decomposition of the complex logic gate and the detuning, and return to operation 215 when the circuit design system determines that the modified electronic circuit violates the timing checks. The circuit design system may continue to operation 255 when the modified electronic circuit does not violate any timing checks.

At operation 255, the circuit design system may determine whether the early mode slack fails of the selected path have been addressed, as discussed in operation 240. The circuit design system may continue operation 220 when the early mode slack fails of the selected path have been addressed. Alternatively, the circuit design system may return to operation 215 and identify a new complex logic gate for decomposition when the early mode slack fails of the selected path have not been addressed.

Figure 3:
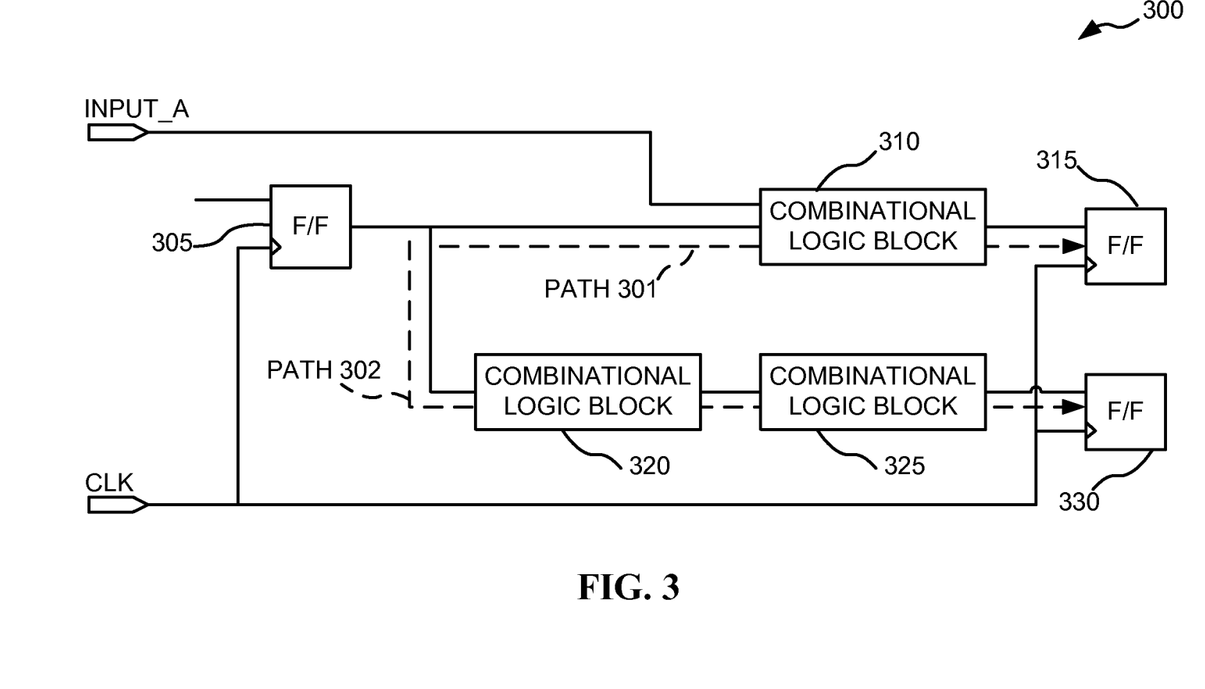
FIG. 3 depicts a block diagram of a circuit which may have early mode slack fails, according to various embodiments.

FIG. 3 depicts a block diagram of a circuit 300 which may have early mode slack fails, according to various embodiments. The circuit 300 includes flip-flops 305, 315 and 330, combinational logic blocks 310, 320 and 325, and input signals INPUT_A, CLK. The combinational logic blocks 310, 320, and 325 may represent complex combinational logic gates.

Flip-flop 315 may receive an input signal from combinational logic block 310. Combinational logic block 310 may provide an input signal to flip-flop 315 in response to receiving a first input signal INPUT_A and a second input signal from flip-flop 305. For the purposes of this disclosure, INPUT_A can be a signal having a constant value. Flip-flop 330 may receive an input signal from combinational logic block 325. Combinational logic block 325 may provide an input signal to flip-flop 330 in response to receiving an input signal from combinational logic block 320. Combinational logic block 320 may provide an input signal to combinational logic block 325 in response to receiving an input signal from flip-flop 305. Flip-flops 305, 315 and 330 may be clocked by the same input signal CLK. The propagation delay (e.g., a combinational logic block delay) of a signal traversing one of the combinational logic blocks (e.g. combinational logic blocks 310, 320 and 325) from an input to an output of the combinational logic block may be the same for each combinational logic block.

Flip-flops 315 and 330 may be part of a register bank and configured to capture inputs received from combinational logic circuits 310 and 325 during each cycle of clock input CLK (e.g., the flip-flops latch the outputs of the combinational logic blocks after being triggered by an edge of CLK). A given technology specific implementation of the circuit 300 may specify a hold time requirement (e.g., a threshold early mode slack value) for the input signals received from combinational logic blocks 310 and 325. The hold time requirement may specify that the input signals received from combinational logic blocks 310 and 325 may not go unstable for a threshold amount of time after an edge of CLK is received at flip-flops 315 and 330.

Each cycles of CLK received at flip-flop 305 may cause the flip-flop to provide a new signal value to the inputs of combinational logic blocks 310 and 320. After each cycle of CLK, the new signal value from flip-flop 305, as propagated along PATH 301, may take at least one combinational logic block delay to reach the input of flip-flop 315. Similarly, the new signal value from flip-flop 305, as propagated along PATH 302, may take at least two combinational logic block delays to reach the input of flip-flop 330. In some embodiments, two combinational logic block delays may be sufficient to satisfy the hold time requirements (e.g. early mode slack requirements) for the circuit 300, while a one combinational logic block delay may cause a violation of the hold time requirement. Consequently, PATH 301 may have an early mode slack fail because the delay in the path is too small (e.g., a signal conducted along the path propagates too fast) to satisfy the hold time requirements of the circuit 300.

Figure 4:
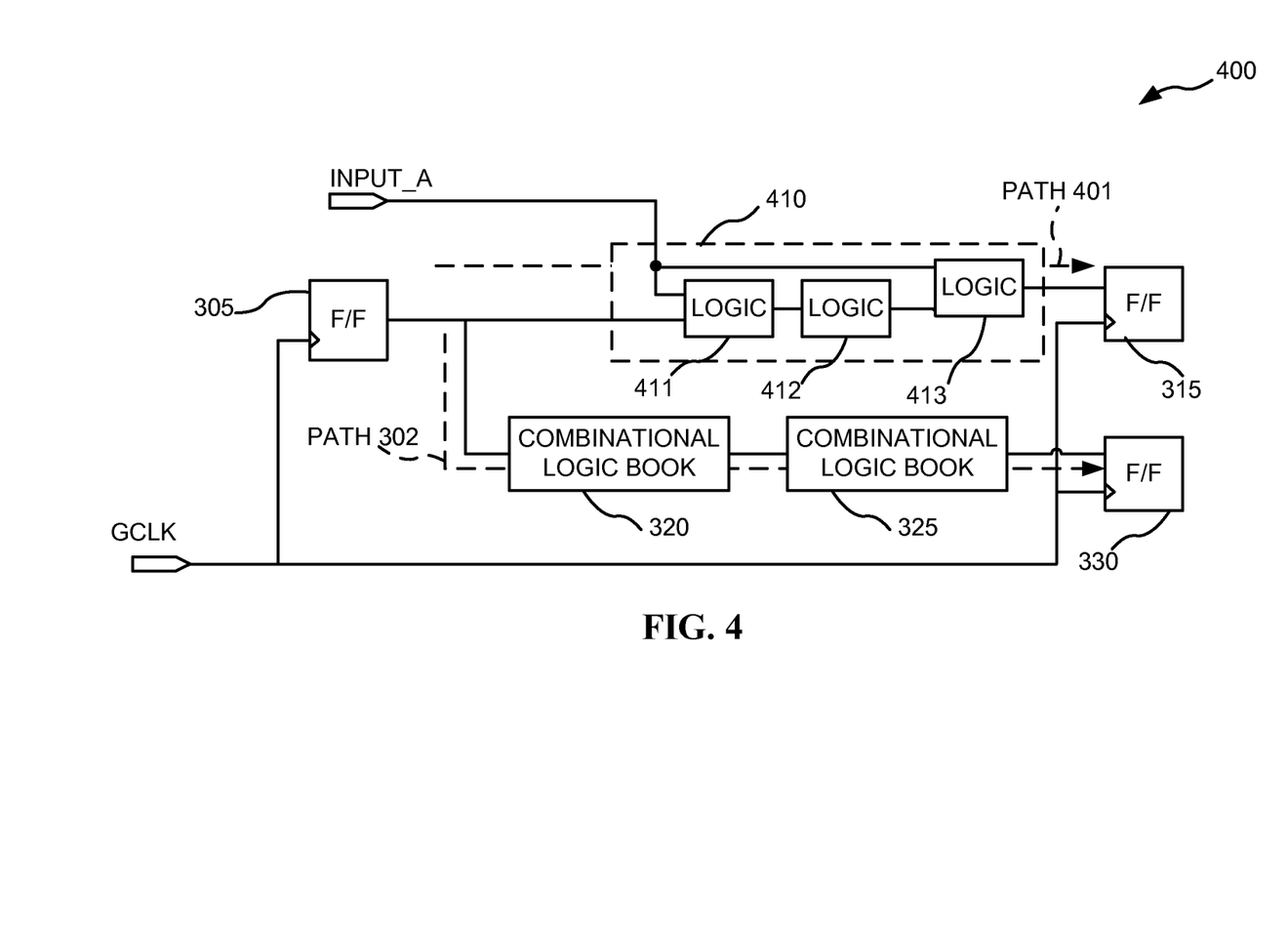
FIG. 4 depicts a circuit configured to correct early mode slack fails by complex book decomposition, according to various embodiments.

FIG. 4 depicts a circuit 400 configured to correct early mode slack fails by complex book decomposition, according to various embodiments. The circuit 400 is an equivalent embodiment of the circuit 300 in FIG. 3, with the exception that the early mode slack violation of the circuit 300 has been addressed by decomposing combinational logic block 310 into a configuration of constituent logic gates 410 using the methods described herein. The configuration of constituent logic gates 410 includes constituent logic blocks 411, 412 and 413.

The constituent logic blocks 411, 412, 413 each represent discrete logic functions collectively configured to perform the logic function of the combinational logic block 310. Decomposing the combinational logic block 310 into three discrete logic blocks may increase the delay along PATH 401 (e.g., the delay in path 410 may be longer the delay of path 301 in the circuit 300) as experienced by a signal propagated from the output of flip-flop 305 to the input of flip-flop 315. The increased delay in PATH 401 may address the early mode slack fail seen in the circuit 300 by increasing the early mode slack of the signal propagated along the path.

Figure 5A:
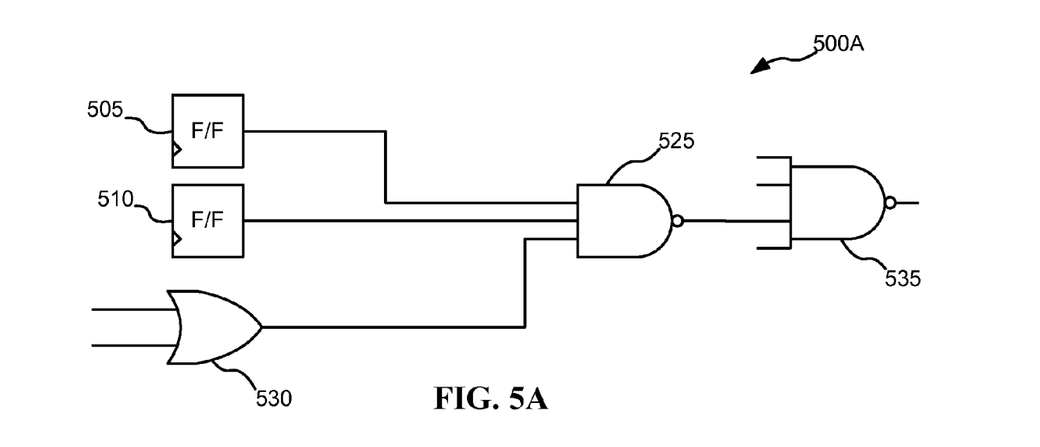
FIG. 5A depicts a schematic diagram of an electronic logic circuit which may have early mode slack fails, according to various embodiments.

FIG. 5A depicts a schematic diagram of an electronic logic circuit 500A which may have early mode slack fails, according to various embodiments. As shown in circuit 500A, a 4-input NAND gate 535 receives an input from a 3-input NAND gate 525 (e.g. a complex logic gate). The 3-input NAND 525 provides an input to NAND gate 535 in response to receiving inputs from flip-flops 505 and 510, and 2-input OR gate 530. In some embodiments, a signal propagated through OR gate 530 may experience a longer delay (e.g., a slower path) to NAND gate 525 than signals propagated from the outputs of flip-flops 505 and 510. Consequently, the circuit 500A may have early mode violations at the inputs of NAND gate 525 that are coupled to flip-flops 505 and 510. The resulting violations may cause early mode slack rails at NAND gate 535.

Figure 5B:
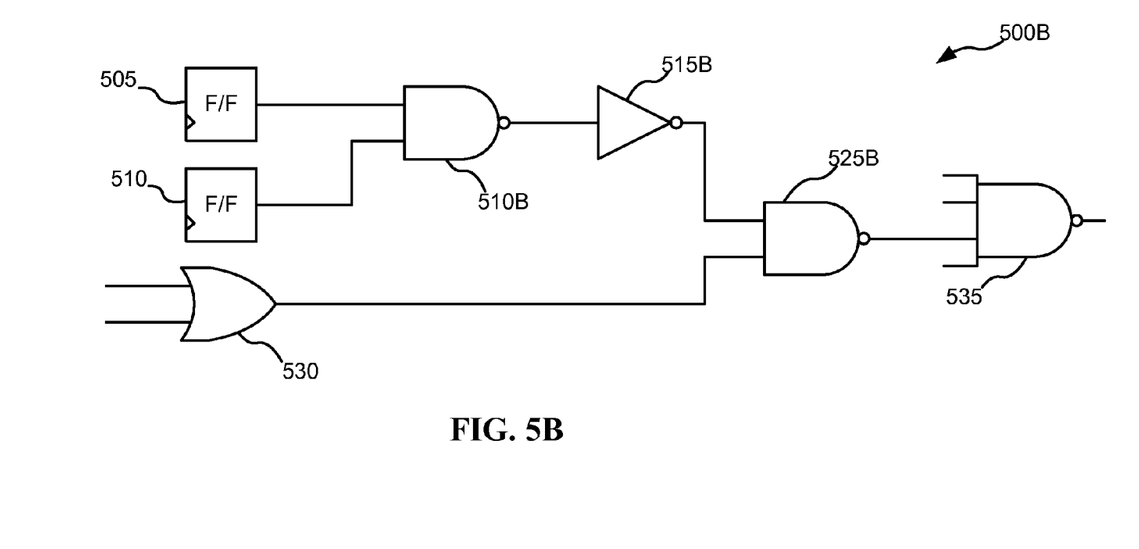
FIG. 5B depicts a schematic diagram of an electronic logic circuit configured to correct early mode slack fails by complex book decomposition, according to various embodiments.

FIG. 5B depicts a schematic diagram of an electronic logic circuit 500B configured to correct early mode slack fails by complex book decomposition, according to various embodiments. The circuit 500B may be an embodiment of an electronic circuit equivalent to the circuit 500A with the exception that the early mode slack violations of the circuit 500A are addressed by decomposing the 3-input NAND gate 525 of the circuit 500A into two 2-input NAND gates 510B and 525B, and inverter 515B.

Figure 6:
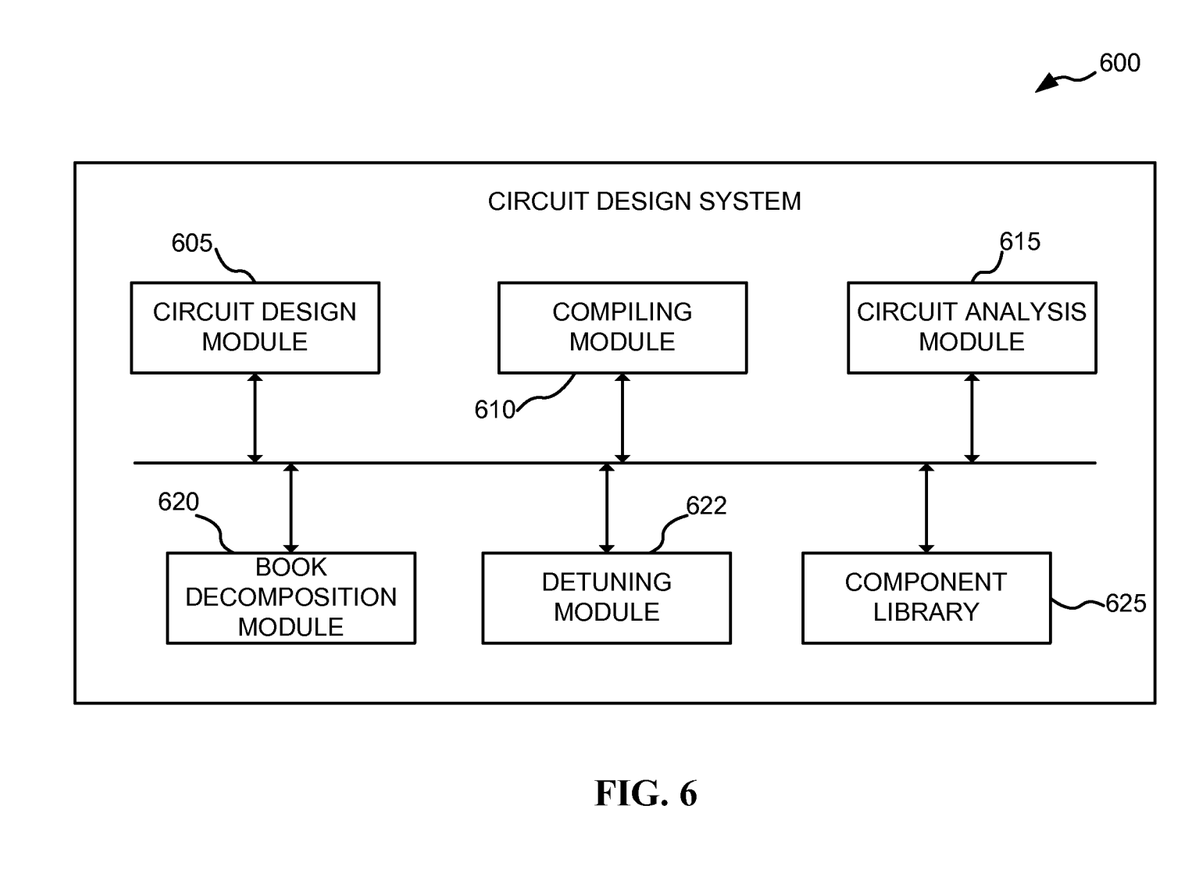
FIG. 6 depicts a block diagram of a circuit design system for correcting early mode slack fails in electronic circuits, according to various embodiments.

FIG. 6 depicts a block diagram of a circuit design system 600 for correcting early mode slack fails in electronic circuits, according to various embodiments. The circuit design system 600 may be embodied in a software application stored in the memory of a computing device, and configured to execute on a processor of the computing device. The circuit design system may include circuit design module 605, compiling module 610, circuit analysis module 615, book decomposition module 620, detuning module 622, and component library 625. Collectively, the circuit design system may be embodied in a script or software application configured to automatically interface with, and exchange message, including data, between each module while carrying out the methods of this disclosure.

The circuit design module 605 may be configured to automatically generate a logical description of an electronic circuit by reading an electronic file containing a description of the circuit (e.g. an electronic schematic) and selecting logic cells or books from the component library 625 to use in the generation of the logical description. The circuit design module may provide a file containing the logical description of the electronic circuit to the circuit design system 600 (e.g., the file may be provided to a script configured to interface with the components of the circuit design system).

The compiling module 605 may receive, from the circuit design system (e.g., executing on the behalf of a controlling script), an electronic file having a logical description of an electronic circuit. The compiling module 605 to may be configured to compile, on the behalf of the circuit design system 600, a technology specific representation of the electronic circuit by drawing from a library of technologic specific resources, including timing data information and formulas representing, inter alia, propagation delays through components and their interconnects (e.g., traces). The circuit design module 605 may be further configured to provide, to the circuit design system 600, a technology specific representation of the compiled electronic circuit, including information (e.g., timing data, device models, and requirements) to enable a timing analysis of the electronic circuit.

Circuit analysis module 615 may receive, from the circuit design system 600, an electronic file having a compiled technology specific representation of an electronic circuit. The circuit analysis module 615 may be configured to process the data, models, and requirements contained in the technology specific representation of the electronic circuit and analyze the timing characteristics of the circuit to determine whether one or more paths of the electronic circuit have timing violations, including early mode and late mode timing violations, early mode and late mode slack fails, and electronic time violations as described herein. The circuit analysis module 615 may provide the results of the timing analysis to the circuit design system 600.

Book decomposition module 620 may receive a complex logic circuit (e.g., a complex book) from the circuit design system for decomposition. The circuit design system may also provide decomposition module 620 an indication of which inputs to the complex logic gate have early mode violations. The decomposition module 620 may be configured to decompose the complex logic circuit by identifying two or more constituent logic gates or books from component library module 625 that can perform the logic function of the complex logic gate. The decomposition module 620 may be further configured to arrange the two or more constituent logic gates in a configuration that performs the logic function of the complex logic gate. Arranging the two or more constituent gates may include generating a configuration that provides the inputs having early mode violations the longest path through the configuration of two or more constituent logic gates. The decomposition module 620 may provide a logic or a technology specific representation of the configuration of more or more constituent logic gates or of the modified electronic to the circuit design system 600.

Detuning module 622 may receive a technology specific representation of two or more logic gates from the circuit design system for detuning. The detuning module may involve detuning only one of the two or more gates considered for detuning. Detuning module 622 may be configured to detune the logic gates by increasing geometry of the gates (e.g. increase the size of the transistors making up the logic gates), or by increasing the threshold voltage of the gates (e.g., modify the technology specific representation of the gates to specify a higher threshold voltage). The detuning module 622 may provide a technology specific representation of the two or more logic gates (or the electronic circuit) modified to reflect the detuning to circuit design system 600.

Component library 625 may include cells of basic electronic circuit elements (e.g., basic combinational logic gates, latches, and flip-flops). Library component 625 may also include books of more complex logic functions (e.g., complex logic gates). In some embodiments, the component library may include technology specific representations of the logic cells or books, including timing information, physical geometries, and threshold voltages.

Figure 7:
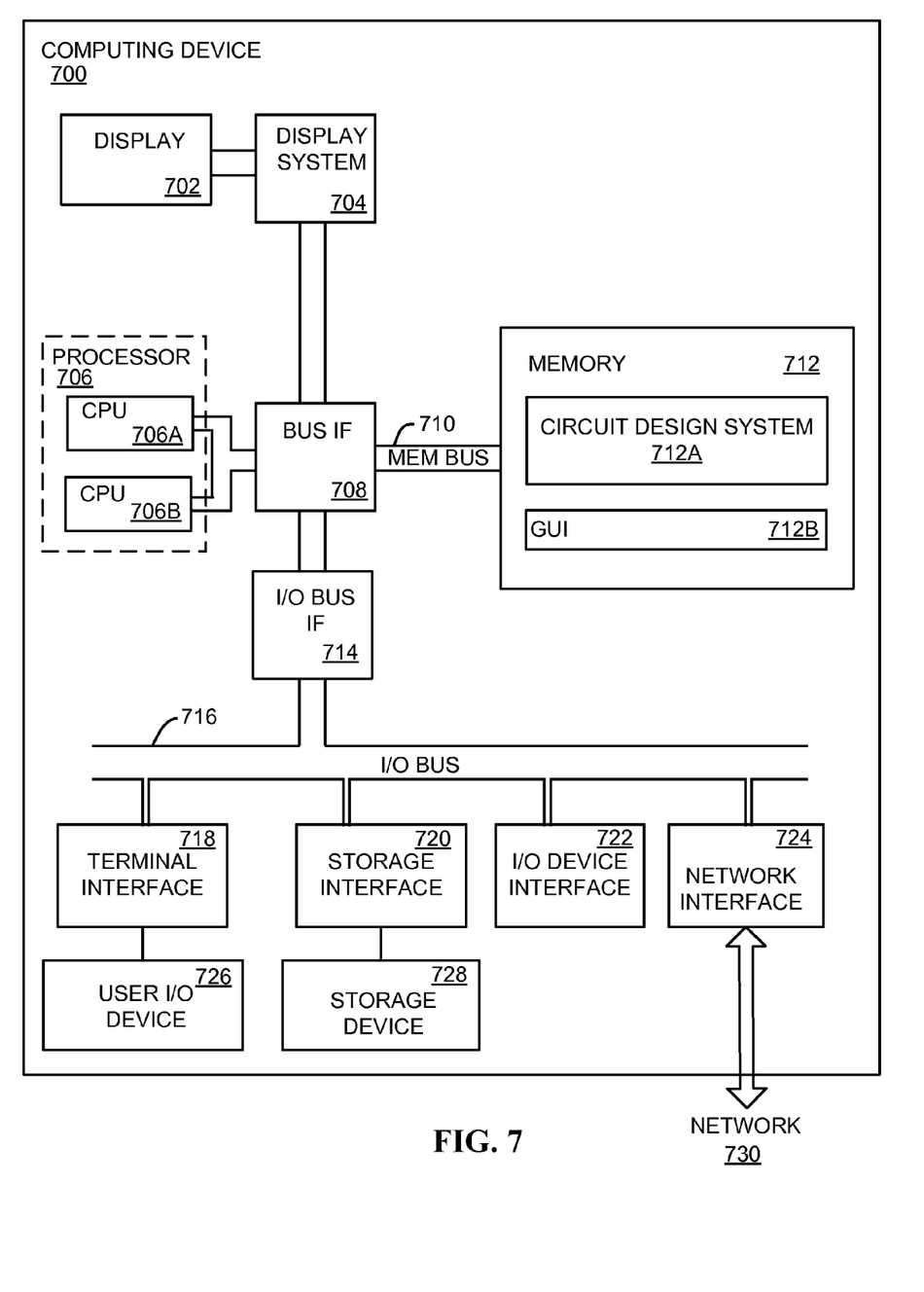
FIG. 7 is a block diagram illustrating an embodiment of a computing device that includes a memory and processor for implementing and executing a circuit design system for correcting early mode slack fails in electronic circuits, according to various embodiments.

FIG. 7 is a block diagram illustrating an embodiment of a computing device that includes a memory and processor for implementing and executing a circuit design system for correcting early mode slack fails in electronic circuits, according to various embodiments. The components of the computing device 700 can include one or more processors 706, a memory 712, a terminal interface 718, a storage interface 720, an Input/Output ("I/O") device interface 722, and a network interface 724, all of which are communicatively coupled, directly or indirectly, for inter-component communication via a memory bus 710, an I/O bus 716, bus interface unit ("IF") 708, and an I/O bus interface unit 714.

The computing device 700 may include one or more general-purpose programmable central processing units (CPUs) 706A and 706B, herein generically referred to as the processor 706. In certain embodiments, a processor may be any electronic device having a datapath for executing a sequence of programmed instructions and capable of performing arithmetic logic computations (e.g., using an arithmetic logic unit), include application specific integrated circuits, and field programmable gate arrays. In an embodiment, the computing device 700 may contain multiple processors; however, in another embodiment, the computing device 700 may alternatively be a single CPU device. Each processor 706 executes instructions stored in the memory 712.

The computing device 700 may include a bus interface unit 708 to handle communications among the processor 706, the memory 712, the display system 704, and the I/O bus interface unit 714. The I/O bus interface unit 714 may be coupled with the I/O bus 716 for transferring data to and from the various I/O units. The I/O bus interface unit 714 may communicate with multiple I/O interface units 718, 720, 722, and 724, which are also known as I/O processors (IOPs) or I/O adapters (IOOAs), through the I/O bus 716. The display system 704 may include a display controller, a display memory, or both. The display controller may provide video, audio, or both types of data to a display device 702. The display memory may be a dedicated memory for buffering video data. The display system 704 may be coupled with a display device 702, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 704 may be on board an integrated circuit that also includes the processor 706. In addition, one or more of the functions provided by the bus interface unit 708 may be on board an integrated circuit that also includes the processor 706.

The I/O interface units support communication with a variety of storage and I/O devices. For example, the terminal interface unit 718 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 726 and the computing device 700, may receive output data via the user output devices. For example, a user interface may be presented via the user I/O device 726, such as displayed on a display device, played via a speaker, or printed via a printer.

The storage interface 720 supports the attachment of one or more disk drives or direct access storage devices 728 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 728 may be implemented via any type of secondary storage device. The contents of the memory 712, or any portion thereof, may be stored to and retrieved from the storage device 728 as needed. The I/O device interface 722 provides an interface to any of various other I/O devices or devices of other types, such as printers or fax machines. The network interface 724 provides one or more communication paths from the computing device 700 to other digital devices and computer systems.

Although the computing device 700 shown in FIG. 7 illustrates a particular bus structure providing a direct communication path among the processors 706, the memory 712, the bus interface 708, the display system 704, and the I/O bus interface unit 714, in alternative embodiments the computing device 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 714 and the I/O bus 708 are shown as single respective units, the computing device 700, may include multiple I/O bus interface units 714 and/or multiple I/O buses 716. While multiple I/O interface units are shown, which separate the I/O bus 716 from various communication paths running to the various I/O devices, in other embodiments, some or all of the I/O devices are connected directly to one or more system I/O buses.

In various embodiments, the computing device 700 is a multi-user mainframe computer system, a single-user system, or a server computer or similar device that has little or no direct user interface, but receives requests from other computer systems (clients). In other embodiments, the computing device 700 may be implemented as a desktop computer, portable computer, laptop or notebook computer, tablet computer, pocket computer, telephone, smart phone, or any other suitable type of electronic device.

In an embodiment, the memory 712 may include a random-access semiconductor memory, storage device, or storage medium (either volatile or non-volatile) for storing or encoding data and programs. In another embodiment, the memory 712 represents the entire virtual memory of the computing device 700, and may also include the virtual memory of other computer systems coupled to the computing device 700 or connected via a network 730. The memory 712 may be a single monolithic entity, but in other embodiments the memory 712 may include a hierarchy of caches and other memory devices. For example, memory may exist in multiple levels of caches, and these caches may be further divided by function, so that one cache holds instructions while another holds non-instruction data, which is used by the processor. Memory 712 may be further distributed and associated with different CPUs or sets of CPUs, as is known in any various so-called non-uniform memory access (NUMA) computer architectures.

The memory 712 may store all or a portion of the components and data shown in FIGS. 1-6. In particular, the memory 712 may store the circuit design system 712A, along with the modules, scripts and library components used to implement the methods of the present disclosure. The circuit design system 712A may be an equivalent embodiment of the circuit design system 600 shown in FIG. 6. The memory 712 may also include a graphical user interface (GUI) 712B for interfacing with the circuit design system 712A. These programs and data structures are illustrated in FIGS. 1-6 as being included within the memory 712 in the computing device 700; however, in other embodiments, some or all of them may be on different computer systems and may be accessed remotely, e.g., via a network 730. The computing device 700 may use virtual addressing mechanisms that allow the programs of the computing device 700 to behave as if they only have access to a large, single storage entity instead of access to multiple, smaller storage entities. Thus, while the components and data shown in FIGS. 1-6 are illustrated as being included within the memory 712, these components and data are not necessarily all completely contained in the same storage device at the same time. Although the components and data shown in FIGS. 1-6 are illustrated as being separate entities, in other embodiments some of them, portions of some of them, or all of them may be packaged together.

In an embodiment, the components and data shown in FIGS. 1-6 may include instructions or statements that execute on the processor 706 or instructions or statements that are interpreted by instructions or statements that execute the processor 706 to carry out the functions as further described below. In another embodiment, the components shown in FIGS. 1-6 may be implemented in hardware via semiconductor devices, chips, logical gates, circuits, circuit cards, and/or other physical hardware devices in lieu of, or in addition to, a processor-based system. In an embodiment, the components shown in FIGS. 1-6 may include data in addition to instructions or statements.

FIG. 7 is intended to depict representative components of the computing device 700. Individual components, however, may have greater complexity than represented in FIG. 7. In FIG. 7, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for correcting early mode slack fails in an electronic circuit, comprising:
generating a logical description of an electronic circuit having a first path from first circuit to a second circuit;
compiling, by a processor, the logical description into a technology specific representation of the electronic circuit;
determining, by a processor, that a second path in the technology specific representation of the electronic circuit corresponding with the first path has a first early mode slack fail at the second circuit, wherein an early mode slack fail results when an output of the first circuit coupled to an input of the second circuit has an early mode slack below a first threshold value;
identifying, in response to the determining, a complex logic gate located in the second path and having an output coupled to the input of the second circuit, that can be decomposed into two or more logic gates; and
decomposing, by a processor, the complex logic gate into a two or more logic gates to address the early mode slack fail, wherein an electrical signal propagating in the second path to the second circuit though the decomposed complex logic gate traverses at least one logic stage more than an electrical signal propagating in the second path to the second logic circuit though the complex logic gate.

2. The method of claim 1, wherein the identifying further includes:
determining that the complex logic gate has at least one input having an early mode timing violation.

3. The method of claim 2, further comprising:
determining, subsequent to the decomposing, that the second path has a second early mode slack fail at the second circuit;
detuning, in response to determining that the second path has a second early mode slack fail at the second circuit, the two or more logic gates to increase the early mode slack above the threshold value.

4. The method of claim 2, wherein the detuning includes increasing a threshold voltage of one or more transistors in the one or more logic gates.

5. The method of claim 2, wherein the detuning includes reducing a drive strength of the one or more logic gates.

6. The method of claim 1, wherein the identifying comprises:
identifying, in the second path, a first complex logic gate having a first difference between early mode and late mode arrival times, and a second complex logic gate having second difference between early mode and late mode arrival times;
determining that the first difference is numerically greater than the second difference; and
selecting, in response to determining that the first difference is numerically greater, the first complex logic gate for decomposition.

7. The method of claim 1, further comprising:
determining, in response to the decomposing, whether one or more timing checks were violated by the one or more logic gates;
rejecting, in response to determining that one or more timing checks were violated, the decomposition; and
accepting, in response to determining that one or more timing checks were not violated, the decomposition.

8. The method of claim 3, further comprising:
determining, in response to the detuning, whether one or more timing checks were violated by the one or more logic gates;
rejecting, in response to determining that one or more timing checks were violated, the detuning; and
accepting, in response to determining that one or more timing checks were not violated, the detuning.

9. A computer system for addressing early mode slack fails in an electronic circuit, comprising:
one or more computing nodes having a memory and a processor; and
a non-transitory computer readable storage medium of the one or more computing nodes having program instructions embodied therewith, the program instructions executable by the processor to cause the computer system to:
generate a logical description of an electronic circuit having a first path from first circuit to a second circuit;
compile the logical description into a technology specific representation of the electronic circuit;
determine that a second path in the technology specific representation of the electronic circuit corresponding with the first path has a first early mode slack fail at the second circuit, wherein an early mode slack fail results when an output of the first circuit coupled to an input of the second circuit has an early mode slack below a first threshold value;
identify, in response to determining, a complex logic gate located in the second path and having an output coupled to the input of the second circuit, that can be decomposed into two or more logic gates; and
decompose, by a processor, the complex logic gate into a two or more logic gates to address the early mode slack fail, wherein an electrical signal propagating in the second path to the second circuit though the decomposed complex logic gate traverses at least one logic stage more than an electrical signal propagating in the second path to the second logic circuit though the complex logic gate.

10. The computer system of claim 9, wherein the program instructions executable by the processor further cause the computer system to:
determine that the complex logic gate has at least one input having an early mode timing violation.

11. The computer system of claim 10, wherein the program instructions executable by the processor further cause the computer system to:
determine, subsequent to decomposing, that the second path has a second early mode slack fail at the second circuit;
detune, in response to determining that the second path has a second early mode slack fail at the second circuit, the two or more logic gates to increase early mode slack above the threshold value.

12. The computer system of claim 10, wherein the program instructions executable by the processor further cause the computer system to:

increase a threshold voltage of one or more transistors in the one or more logic gates.

13. The computer system of claim 10, wherein the program instructions executable by the processor further cause the computer system to:
reduce a drive strength of the one or more logic gates.

14. The computer system of claim 9, wherein the program instructions executable by the processor further cause the computer system to:
identify, in the second path, a first complex logic gate having a first difference between early mode and late mode arrival times, and a second complex logic gate having second difference between early mode and late mode arrival times;
determine that the first difference is numerically greater than the second difference; and
select, in response to determining that the first difference is numerically greater, the first complex logic gate for decomposition.

15. A computer program product for addressing early mode slack fails in an electronic circuit, the computer program product including a non-transitory computer readable storage medium having program instructions embodied therewith, the program instructions executable by a processing circuit to cause the processing circuit to perform a method comprising:
generating a logical description of an electronic circuit having a first path from first circuit to a second circuit;
compiling, by a processor, the logical description into a technology specific representation of the electronic circuit;
determining, by a processor, that a second path in the technology specific representation of the electronic circuit corresponding with the first path has a first early mode slack fail at the second circuit, wherein an early mode slack fail results when an output of the first circuit coupled to an input of the second circuit has an early mode slack below a first threshold value;
identifying, in response to the determining, a complex logic gate located in the second path and having an output coupled to the input of the second circuit, that can be decomposed into two or more logic gates; and
decomposing, by a processor, the complex logic gate into a two or more logic gates to address the early mode slack fail, wherein an electrical signal propagating in the second path to the second circuit though the decomposed complex logic gate traverses at least one logic stage more than an electrical signal propagating in the second path to the second logic circuit though the complex logic gate.

16. The computer program product of claim 15, wherein the identifying further includes:
determining that the complex logic gate has at least one input having an early mode timing violation.

17. The computer program product of claim 16, further comprising:
determining, subsequent to the decomposing, that the second path has a second early mode slack fail at the second circuit;
detuning, in response to determining that the second path has a second early mode slack fail at the second circuit, the two or more logic gates to increase the early mode slack above the threshold value.

18. The computer program product of claim 16, wherein the detuning includes increasing a threshold voltage of one or more transistors in the one or more logic gates.

19. The computer program product of claim 16, wherein the detuning includes reducing a drive strength of the one or more logic gates.

20. The computer program product of claim 1, wherein the identifying comprises:
identifying, in the second path, a first complex logic gate having a first difference between early mode and late mode arrival times, and a second complex logic gate having second difference between early mode and late mode arrival times;
determining that the first difference is numerically greater than the second difference; and
selecting, in response to determining that the first difference is numerically greater, the first complex logic gate for decomposition.

* * * * *